July 28, 1925. 1,547,351
P. SCHWERIN
ELECTRIC HEATER
Filed Nov. 19, 1921
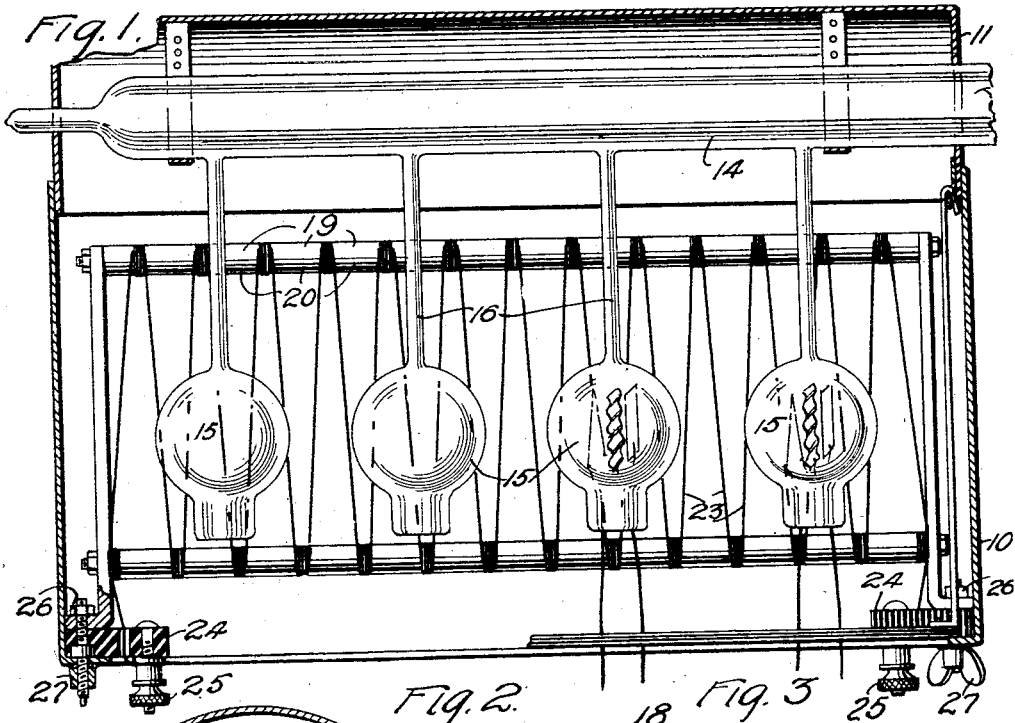
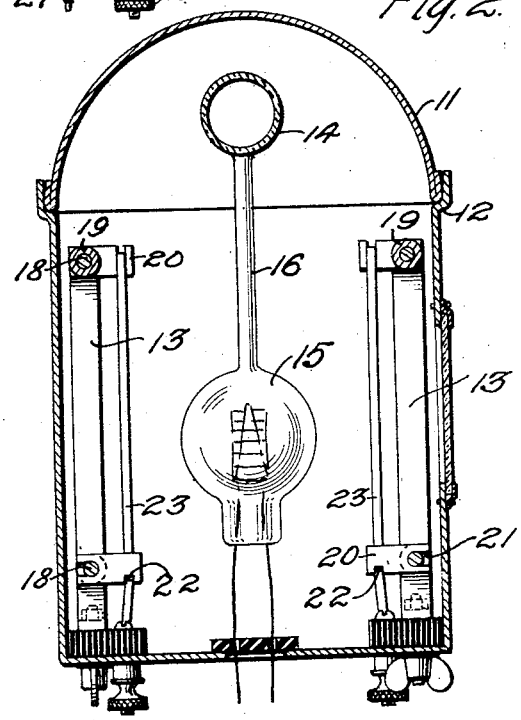
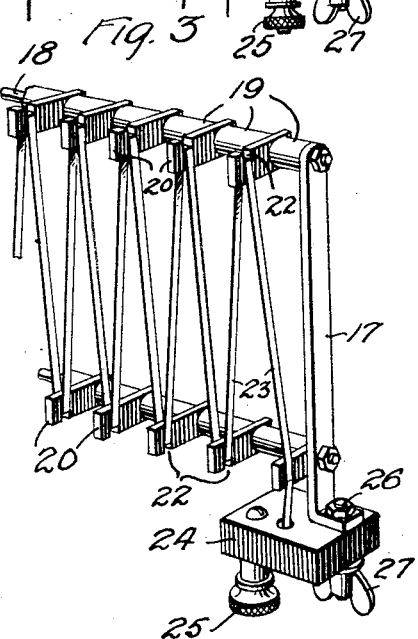
Inventor:
Paul Schwerin,
by O. S. Sprague Att'y.

Patented July 28, 1925.

1,547,351

UNITED STATES PATENT OFFICE.

PAUL SCHWERIN, OF NEW YORK, N. Y., ASSIGNOR TO WESTERN ELECTRIC COMPANY, INCORPORATED, OF NEW YORK, N. Y., A CORPORATION OF NEW YORK.

ELECTRIC HEATER.

Application filed November 19, 1921. Serial No. 516,259.

*To all whom it may concern:*

Be it known that I, PAUL SCHWERIN, a citizen of the United States, residing at New York, in the county of Bronx, State of New York, have invented certain new and useful Improvements in Electric Heaters, of which the following is a full, clear, concise, and exact description.

This invention relates to electric heating and pertains more especially to means for heating vacuum tubes during the pumping thereof.

An object of the invention is the provision of a compact and sturdy electrical heating element of such a character that it may be assembled exterior of the device in which it is to be used and may be located in or removed from said device as a unit without affecting the other elements of said device.

A further object of the invention is the provision of a heating element which is highly efficient and in which the members of the element are thoroughly insulated from each other.

An additional object of the invention is to provide an electrical resistance heating unit in which the resistance is so arranged as to produce uniform heating effect throughout the entire unit.

These objects are obtained by providing a frame comprising end members and longitudinal members. Alternately arranged on each of the longitudinal members are a plurality of spacing elements and a plurality of supports formed of insulating and heat resisting material. The supports are so supported by the longitudinal members that they extend laterally therefrom and the supports on one of said members are slightly offset from the supports on the other. A resistance element is strung back and forth over the supports to form a zigzag heating member. The resistance element is preferably a metallic ribbon arranged with its flat surface at right angles to the longitudinal plane of the frame. The frame is adapted to be clamped within the oven casing and may be placed in or removed from the casing with the heating member assembled thereon.

A further object of the invention is to so form the supports that they may be easily and quickly attached to or removed from the frame.

Other objects of the invention will be apparent from the following specification and accompanying drawing wherein Fig. 1 is a longitudinal vertical section through an oven equipped with a heating unit constructed in accordance with the invention; Fig. 2 is a transverse vertical section thereof; and Fig. 3 is a partial perspective view of the heating element.

The oven casing comprises a box like lower portion 10 and a substantially semicylindrical cover 11, the longitudinal edges of which rest upon the shoulders 12 formed in the casing 10 by offsetting the upper edges of the side walls. The inner surface of the casing and cover is of polished heat reflecting material, such as nickel, aluminum and the like. Arranged within the box 10 near the side walls thereof are the heating units 13. The header 14 of the pumping apparatus is arranged within and supported by the cover 11. The vacuum tubes 15 to be exhausted are connected by the tubulatures 16 to the header 14 and are arranged between the heating units 13.

Each heating unit comprises a frame composed of a pair of end members 17 between which extend a pair of rods 18. The rods 18 are arranged near the upper and lower portions of the end members 17 and extend through apertures provided in said end members. On the rods 18 are arranged a series of tubular spacing members 19. Between each pair of tubular members is arranged a block 20 of insulating material, preferably lavite. At the rear end of each block is cut a slot 21, as shown in Fig. 2, through which extends a rod 18 when the blocks are in position. At the opposite end of the block is provided a groove 22 which forms a hook for supporting a metallic ribbon or resistance element 23. This ribbon is strung back and forth between the various hooks with its flat surfaces in planes at right angles to the plane of the frame in order to produce a zigzag arrangement. The blocks 20 are held in their horizontal position by being clamped between the sleeves 19. The necessary pressure for the clamping is obtained by means of nuts threaded on the ends of the rod and which may be tightened to produce a rigid construction. Because of the provision of slots in the rear ends of the elements 21, it is necessary only to loosen the nuts in order to slip the members 21 into or out of position. The replacement of broken blocks is therefore a very simple matter.

The end members 17 are supported upon blocks 24 of insulating material. Extending from the lower face of each block 24 is a binding post 25 to which the end of the ribbon 23 is attached and by means of which supply conductors (not shown) from a source of electrical energy may be connected with the ribbon in order to provide the heating current. A bolt 26 by means of which the end members are attached to the blocks 24, projects some distance below the bottom face and is provided with a wing nut 27. In the bottom of the box 10 on each end are provided apertures for the binding post 25 and the bolts 26, respectively. With the bolts 26 extending through the apertures, the wing nuts 27 are applied and tightened in order to clamp the frame in place in the box. Whenever it is necessary or desirable to repair the frame it is necessary only to release the nuts 27 and disconnect the supply conductors from the binding posts, separate the box 10 from the cover 11 and lift out the frame.

The heat supplied by the resistance 23 is radiated toward the tubes to be exhausted and toward the walls of the oven. That portion of the heat radiated toward the walls is reflected back toward the tubes and is also effective to accomplish the heating of the tubes.

The arrangement of the ribbon 23 with its edges directed toward the center and side of the casing insures a uniform distribution of heat. As the ribbon expands upon heating, it has a tendency to buckle. The buckling, however, will take place solely in a vertical plane parallel to the plane of the frame and so there will be no local overheating due to one portion of the ribbon being at a different distance from the side of the casing than another.

It is obvious that various modifications may be made in the structure of the apparatus above described without departing in anywise from the spirit of the invention as set forth in the appended claims.

What is claimed is:

1. An electric heater comprising a metallic frame, a plurality of insulators each having one end removably attached to said frame and the other end projecting from said frame, and an electrical conductor strung over the projecting ends of said insulators.

2. In an electric heater, a frame comprising a pair of longitudinal members, a plurality of insulators carried by each of said members projecting beyond said frame, spacing members interposed between said insulators, and an electrical conductor strung between said insulators.

3. In an electric heater, a frame comprising a pair of longitudinal members, a pair of sets of insulators, each of said insulators being removably carried by one of said members and projecting beyond said frame, and an electrical conductor strung between said insulators.

4. In an electric heater, a frame comprising a pair of longitudinal members, insulators carried by said members and having slots in which said members are arranged, and an electrical conductor strung between said insulators.

5. In an electric heater, a frame comprising a plurality of longitudinal members, insulators carried by said members and having slots in which said members are arranged, sleeves interposed between said insulators and an electrical conductor strung between said insulators.

6. In an electric heater, a frame comprising end members, longitudinal members extending between said end members, insulators mounted on said longitudinal members, spacing means interposed between said insulators, means to clamp all of said previously mentioned elements in position, and a conductor strung between said insulators.

7. In an electric heater, a frame comprising end members, longitudinal members having their ends passing through said end members, insulators having slots through which said longitudinal members extend, sleeves on said longitudinal members interposed between said insulators, and nuts on the ends of said longitudinal members to clamp the various elements in position.

8. In an electric oven, a frame, insulators mounted thereon, a conductor strung between said insulators, blocks on the bottom of said frame, and means to attach said blocks to the oven casing.

9. In an electric oven, a frame, insulators mounted thereon, a conductor strung between said insulators, insulating blocks arranged on the bottom of said frame, means to attach said blocks to the oven casing, and binding posts on said block for establishing electrical connection between said conductor and a source of electrical energy.

10. An electric heater comprising a frame, a plurality of insulators removably supported by said frame, and a metallic ribbon strung between said insulators, the surfaces of said ribbon being at right angles to the plane of said frame.

11. An electric heater comprising a frame, a plurality of insulators supported by said frame, and a conductor strung between said insulators, said conductor being adapted to buckle under expansion substantially solely in a plane parallel to the plane of the frame.

In witness whereof, I hereunto subscribe my name this 16th day of November A. D., 1921.

PAUL SCHWERIN.